July 19, 1932.  A. W. SIZER  1,868,370
MACHINE FOR MOLDING PLASTIC SUBSTANCES
Filed March 19, 1931
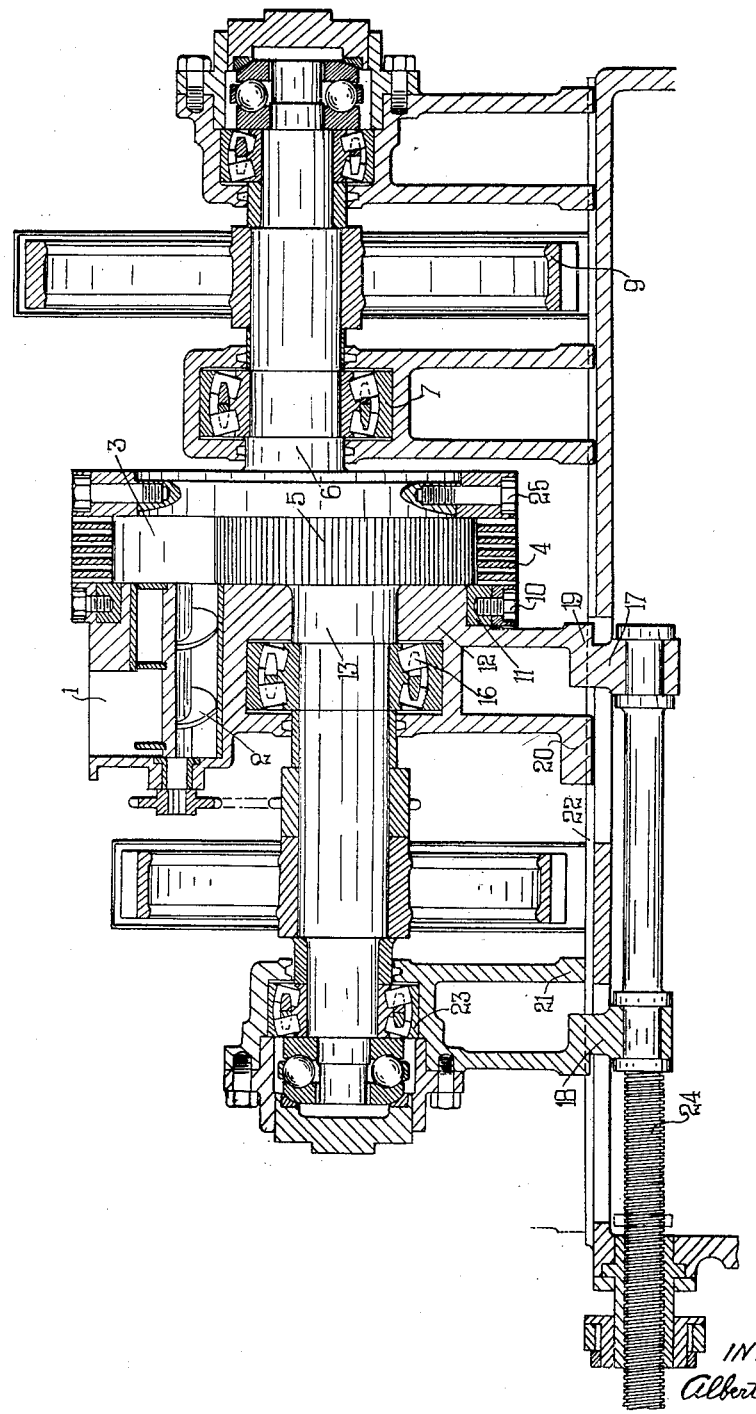
INVENTOR
Albert W. Sizer,
BY
ATTORNEYS.

Patented July 19, 1932

1,868,370

UNITED STATES PATENT OFFICE

ALBERT WILLIAM SIZER, OF HESSLE, ENGLAND

MACHINE FOR MOLDING PLASTIC SUBSTANCES

Application filed March 19, 1931, Serial No. 523,909, and in Great Britain February 18, 1931.

The present invention relates to improvements in machines for the molding of plastic substances of the type in which the co-operating molding rolls are supported on both sides by a bearing in contra-distinction to being over-hung.

According to the present invention one molding roll with its bearing is mounted in guides on a bed-plate to be axially displaceable thereon, so that either roll can be then removed and interchanged when desired.

The invention is more particularly described with reference to the accompanying drawing showing one form of construction by way of example, in sectional elevation.

In the arrangement shown by way of example, the molding machine is of a type suitable for the manufacture for instance, of cattle cake from meal and of the type in which meal fed from a hopper 1 by means of a feed worm 2 comes into a space 3 between a radially ported mold ring 4 and an internal molding roller 5 co-operating with the internal periphery of the mold ring 4.

The mold ring 4 in the construction shown is secured by bolts 25 to a driving shaft 6 carried by a bearing 7 mounted on a bed-plate 8 which shaft 6 is adapted to be driven by pinion or the like gearing 9.

The mold ring 4 is also secured by bolt 10 to a ring 11 bearing on the boss 12 of a frame supporting the shaft 13, forming the drive shaft of the mold wheel 5. This driving shaft 13 is supported by bearings 16 and 23 mounted in frames 12 and 21. The frame 12 has lugs 17 and the frame 21 has lugs 18 on it, and they are further provided with guide surfaces 19, 20 and 21 adapted to slide in a groove 22 on the bed plate 8 so that the bearings 16 and 23 for the shaft 13 can be displaced bodily axially, together with the molding wheel 5 by operation of a threaded spindle 24, which engages with the lugs 17, 18. The spindle 24 can be rotated by a hand crank barring rod or any other desired means.

When therefore, it is desired to remove or replace the mold ring 4 when it is desired to make cubes or pellets of a different size, it will be seen that all that it is necessary to do is to first remove the bolts 10, which will allow the shaft 13 and the mold wheel 5 to be bodily displaced out of range of the mold ring 4, which can then be detached from its driving shaft 6 by removing the bolts 25, and a fresh mold ring 4 mounted in place of it, whereupon the mold wheel 5 can be moved back by operation of the shaft 24 and the new ring 4 locked into position on the bearing sleeve 11 by means of the bolts 10.

It is obvious that the same arrangement may be adapted to machines of the type in which two rollers co-operate for molding material between their external peripheries, or again where material is fed to the lenticular space between the outer peripheries of a pair of rollers, one or both of which may be hollow, and have radial passages through which the material is extruded.

I declare that what I claim is:—

1. A machine for molding plastic substances comprising in combination an annular roller, a bearing for said roller, a second roller co-operating with the interior surface of the said annular roller, a bearing for said second roller, and means to displace one of said rollers out of a plane coincident with the other roller to a plane spaced therefrom but parallel thereto.

2. A machine for molding plastic substances comprising in combination an annular roller, a bearing for said roller, a second roller co-operating with the interior surface of the said annular roller, a bearing for said second roller, and means to displace one of said rollers out of a plane coincident with the other roller to a plane spaced therefrom but parallel thereto, a detachable locking means to normally restrain the revolution of the inner roller coincident with the plane of the outer roller.

3. A machine for molding plastic substances including in combination a pair of co-operating rollers revolving in the same plane, a pair of bearings for said rollers supporting said rollers on one side alone, and means to relatively displace said bearings away from one another to bring said rollers into spaced parallel planes.

In witness whereof, I have hereunto signed my name this 2nd day of March, 1931.

ALBERT WILLIAM SIZER.